United States Patent
Jeppsson et al.

(12)

(10) Patent No.: US 11,252,320 B2
(45) Date of Patent: Feb. 15, 2022

(54) DETERMINING WHETHER A CAMERA IS OUT-OF-FOCUS

(71) Applicant: Axis AB, Lund (SE)

(72) Inventors: Johan Jeppsson, Lund (SE); Björn Benderius, Lund (SE); Niclas Svensson, Lund (SE); Fritjof Jonsson, Lund (SE); Jonas Levin, Lund (SE); Stefan Lindgren, Lund (SE)

(73) Assignee: Axis AB

( * ) Notice: Subject to any disclaimer, the term of this patent is extended or adjusted under 35 U.S.C. 154(b) by 0 days.

(21) Appl. No.: 17/194,611

(22) Filed: Mar. 8, 2021

(65) Prior Publication Data

US 2021/0281738 A1 Sep. 9, 2021

(30) Foreign Application Priority Data

Mar. 9, 2020 (EP) .................................... 20161773

(51) Int. Cl.
*H04N 5/232* (2006.01)
*H04N 7/18* (2006.01)

(52) U.S. Cl.
CPC ..... *H04N 5/23212* (2013.01); *H04N 5/23229* (2013.01); *H04N 7/18* (2013.01)

(58) Field of Classification Search
CPC ......... H04N 5/23212; H04N 5/232123; H04N 5/23229; H04N 7/18; H04N 7/181; H04N 7/185; G06T 5/002; G03B 13/36
See application file for complete search history.

(56) References Cited

U.S. PATENT DOCUMENTS

| 9,398,205 B2 | 7/2016 | Cote et al. |
| 2012/0147197 A1 | 6/2012 | Hjelmstrom et al. |
| 2019/0384033 A1* | 12/2019 | Shirai ................ G02B 27/0025 |

FOREIGN PATENT DOCUMENTS

| CN | 101840055 B | 1/2012 |
| EP | 3054668 A1 | 8/2016 |

OTHER PUBLICATIONS

"How to do Autofocus Fine Tuning on Your Nikon DSLR," https://digital-photography-school.com/how-to-do-autofocus-fine-tuning-on-your-nikon-dslr/, Available at: https://web.archive.org/web/20190510070303/https://digital-photography-school.com/how-to-do-autofocus-fine-tuning-on-your-nikon-dslr/ (May 10, 2019).
Extended European Search Report dated Aug. 14, 2020 for European Patent Application No. 20161773.5.

* cited by examiner

*Primary Examiner* — Paul M Berardesca
(74) *Attorney, Agent, or Firm* — Volpe Koenig

(57) ABSTRACT

A method for determining whether a video camera is out-of-focus comprises: capturing image data; setting a focus setting difference threshold based on a filter function configured to filter the image data; adjusting a focus setting between a present focus setting and an altered focus setting such that a first subset of the image data is captured with the video camera being set in the present focus setting and such that a second subset of the image data is captured with the video camera being set in the altered focus setting, wherein the adjusting is performed such that a difference between the present and altered focus settings is below the threshold; forming the video stream by applying the filter function on the image data; determining first and second focus metrics of the image data; and determining whether the video camera is out-of-focus by comparing the first and second focus metrics.

15 Claims, 2 Drawing Sheets

DETERMINING WHETHER A CAMERA IS OUT-OF-FOCUS

TECHNICAL FIELD

The present invention relates to methods for determining whether a video camera is out-of-focus and to video cameras configured to perform such methods.

BACKGROUND

To keep images sharp and to assure the best possible capture of scene details, video cameras often feature some sort of check to determine whether the camera is out-of-focus, OOF, or not. Sometimes, this function is associated with an autofocus function, AF, of the camera, configured to apply focus information of the camera to automatically tune its focus settings. For cameras with continuous AF, OOF determination may typically involve performing so called hill checking, also known as hill climbing, occasionally to verify that the camera is still in focus. Hill checking may entail back and forth altering of camera focus settings and analyzing the resulting images in terms of e.g. image sharpness. This process may be iteratively repeated until the sharpness cannot be increased anymore through further iterations i.e. the top of the hill is reached. The hill may resemble a Gaussian curve. Ideally, hill checking should be performed more or less continuously as to enable continuous feedback about whether the camera is OOF or not. However, hill checking generally degrades the details in the image due to the back and forth altering of focus settings. This effect may be perceived as a visual annoyance to anyone viewing the captured images. The effect may also distort the images and thus unintendedly destroy finer details included therein. There is thus need for improvements within the technical field.

SUMMARY OF THE INVENTION

Mitigating some of the above issues may comprise a method for determining whether a video camera is out-of-focus, the method comprising:

capturing, by an image sensor of the video camera, image data;

setting a focus setting difference threshold based on a filter setting of a filter function, wherein the filter function is configured to filter the image data as part of transforming the image data to a video stream;

while capturing the image data, adjusting a focus setting of the video camera between a present focus setting and an altered focus setting such that a first subset of the image data is captured with the video camera being set in the present focus setting and such that a second subset of the image data is captured with the video camera being set in the altered focus setting, wherein the adjusting is performed such that a difference between the present focus setting and the altered focus setting is below the focus setting difference threshold;

forming the video stream by applying the filter function on the image data;

determining a first focus metric of the first subset of the image data and a second focus metric of the second subset of the image data, wherein the first and second focus metrics are determined on the image data prior to applying the filter function on the image data; and determining whether the video camera is out-of-focus by comparing the first and second focus metrics.

The term image data refers to data pertaining to or being associated with a digital image. Image data may refer to a graphical representation, or any other type of representation, of the digital image.

The term focus setting refers to any setting of the camera pertaining to or being associated with camera focus. One example of a focus setting may be a distance between camera optics and the image sensor. Further examples will be explored within this disclosure.

The term filter function may be understood as any function that removes redundant, or deemed superfluous, information from the image data during the process of forming a video stream. The filter function may be understood as a video encoding step, designed to compress the image data or alternatively, as a more active step of filtering the image data such as a noise filtering step. Various video encoding methods and noise filtering steps are available to the skilled person.

The term focus metric refers to any means of indicating a level of focus of the camera in a particular setup. The focus metric may e.g. be a numerical representation relating to image data sharpness with higher values indicating that the image data has higher sharpness.

OOF determination may be performed without creating lasting distortions in the images, by changing the focus settings sufficiently gently, i.e. in compliance with the focus setting difference threshold, between the present and altered focus settings. Changes in the image data captured with different focus settings may still provide information about changing focus metrics of the camera. At the same time, changes in the image data may be small enough such that a filter function, that may anyway have to be applied as a step in forming of a video stream, would render any changes in the image data due to the changing focus settings invisible in the video stream forming by applying the filter function on the image data.

The method may further comprise determining statistical information relating to the first focus metric of the first subset of the image data and/or the second focus metric of the second subset of the image data.

The term statistical information may refer to information established by statistical analysis, e.g., averaging, of focus metric for image data captured with different focus settings.

As such, more complete and reliable information may be acquired about different image data and focus settings. In turn, this may also improve the reliability of the OOF determination.

According to a second aspect there is provided a non-transitory computer readable storage medium comprising instructions which, when executed by a computer, cause the computer to carry out the method of the first aspect.

The non-transitory computer readable storage medium, intended to execute the method of the first aspect, may accordingly provide similar advantages as the first aspect.

According to a third aspect there is provided a video camera comprising:

an image sensor, configured to capture image data; and
control circuitry, configured to:
set a focus setting difference threshold based on a filter setting of a filter function, wherein the filter function is configured to filter the image data as part of transforming the image data to a video stream;
adjust, while capturing the image data, a focus setting of the video camera between a present focus setting and an altered focus setting such that a first subset of the image data is captured with the video camera being set in the present focus setting and such that a second subset of the image data is captured with the video camera being set in the altered focus setting, wherein the adjusting is performed such that a difference between the present focus setting and the altered focus setting is below the focus setting difference threshold;

form the video stream by applying the filter function on the image data;

determine a first focus metric of the first subset of the image data and a second focus metric of the second subset of the image data, wherein the first and second focus metrics are determined on the image data prior to applying the filter function on the image data;

determine whether the video camera is out-of-focus by comparing the first and second focus metrics.

The video camera may be understood as a video camera configured to perform the methods of the first aspect. The video camera may provide similar advantages as those of the first aspect and the second aspect.

The focus setting difference threshold may be set such that the step of forming the video stream by applying the filter function on common image data, captured with different focus settings, results in substantially indifferent video stream image data.

The different focus settings should in this context be understood as the present focus setting and the altered focus setting.

In essence, the focus setting difference threshold may be setup such that the expected output video stream, will appear the same regardless if the image data is captured with the present focus setting or the altered focus setting.

The filter function may comprise one or more of a noise reduction function and an encoding function.

Advantages of a noise reduction function e.g., a noise filter include a more predictable and modular approach to implementing the present embodiments. An encoding function may be advantageous as such a function may need to be included anyway in order to form an encoded video stream.

The focus setting may comprise a relative position between the image sensor and a focusing lens of the video camera.

Such a focus setting may be readily adjusted between the present and the altered focus setting by mechanical one of, or both of, the focusing lens and the image sensor.

The focus setting may comprise one or more of a lens focal distance, a lens focal depth, and a lens curvature radius.

In general, the term lens or focusing lens may refer to any optical component, or system of optical components, arranged and configured to focus photons onto the image sensor in order to capture the image data.

The first focus metric of the first subset of the image data and the second focus metric of the second subset of the image data may comprise an image sharpness metric.

An image sharpness metric may alternatively be understood as an acutance metric. It may relate to how sharp edge contrasts are perceived in the image.

The first focus metric of the first subset of the image data and the second focus metric of the second subset of the image data may comprise an image contrast metric.

An image contrast metric may relate to spatial color differences in the image. In general, sharp and high contrast image data with may be understood as featuring high frequency pixel information. Such high frequency information arises from sudden and large changes between adjacent pixels in the image.

A further scope of applicability of the present embodiments will become apparent from the detailed description given below. However, it should be understood that the detailed description and specific examples, while indicating preferred embodiments, are given by way of illustration only, since various changes and modifications within the scope will become apparent to those skilled in the art from this detailed description.

Hence, it is to be understood that this specification is not limited to the particular component parts of the device described or acts of the methods described as such device and method may vary. It is also to be understood that the terminology used herein is for purpose of describing particular embodiments only, and is not intended to be limiting.

It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will, in the following, be described in more detail with reference to appended figures. The figures should not be considered limiting; instead they should be considered for explaining and understanding purposes.

As illustrated in the figures, the sizes of layers and regions may be exaggerated for illustrative purposes and, thus, are provided to illustrate the general structures. Like reference numerals refer to like elements throughout.

DETAILED DESCRIPTION

The present teachings will now be described more fully hereinafter with reference to the accompanying drawings, in which currently preferred embodiments are shown. This teachings may, however, be embodied in many different forms and should not be construed as limited to the embodiments set forth herein; rather, these embodiments are provided for thoroughness and completeness, and to fully convey the scope to the skilled person.

Figure 1:
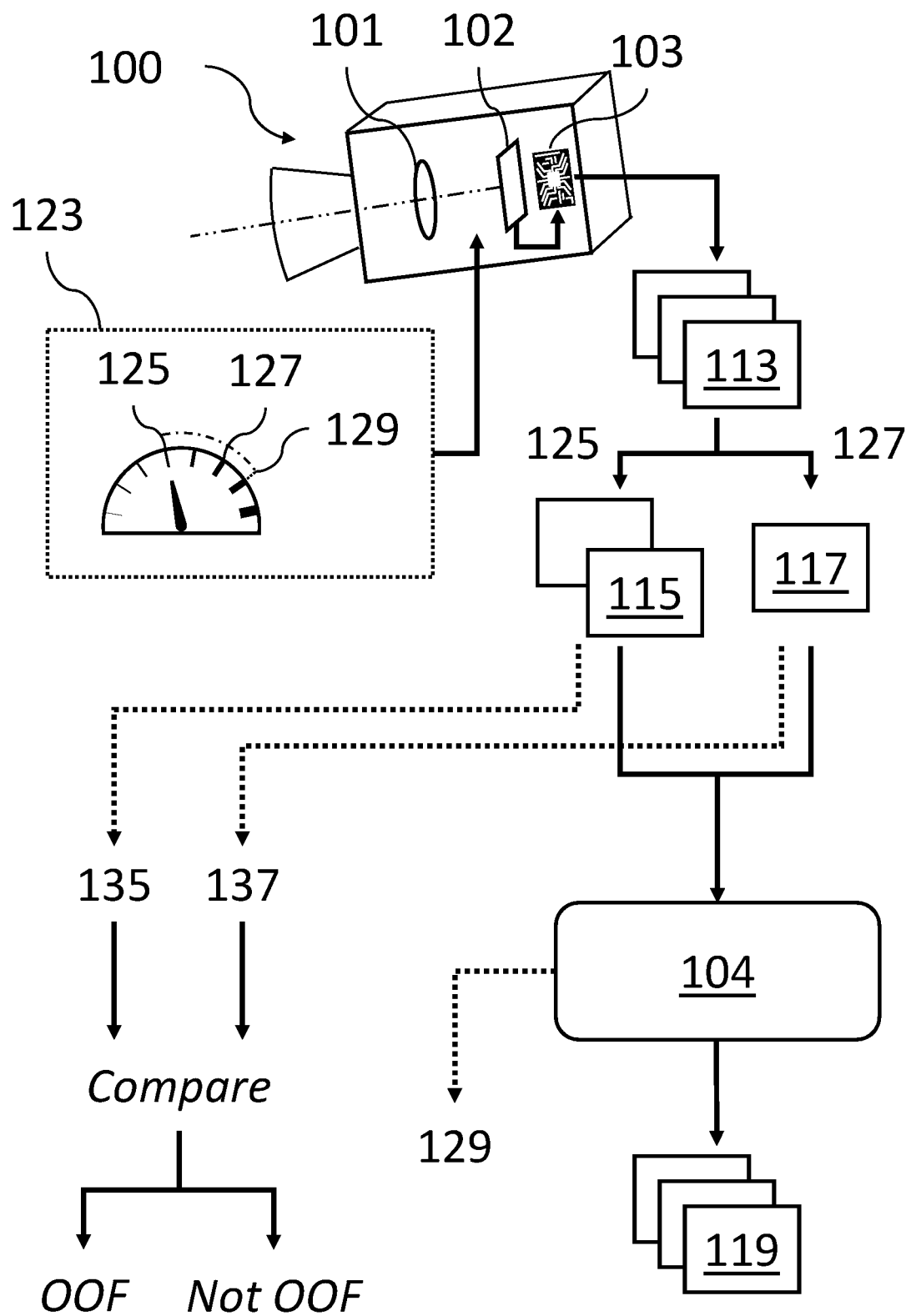
FIG. 1 schematically illustrates a method of determining whether a camera is out-of-focus.
Figure 2:
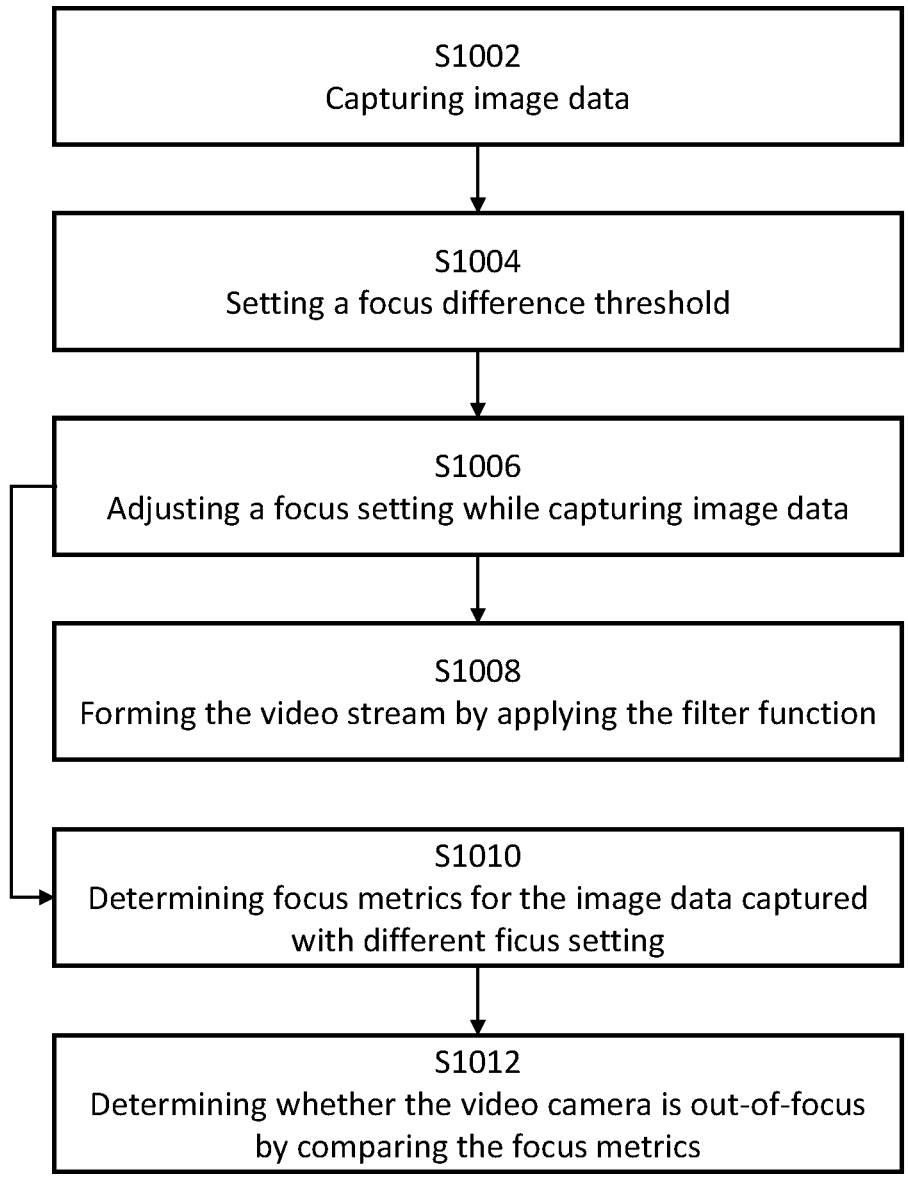
FIG. 2 shows a flowchart for a method of determining whether a camera is out-of-focus.

FIG. 1 schematically illustrates a method for determining whether a video camera 100 is out-of-focus while FIG. 2 shows a flowchart of the same method. The method comprises the following steps/acts. The steps/acts may be performed in any suitable order.

Capturing S1002, by an image sensor 102 of the video camera 100, image data 113. Setting S1004 a focus setting difference threshold 129 based on a filter setting of a filter function 104, wherein the filter function 104 is configured to filter the image data 113 as part of transforming the image data 113 to a video stream 119. While capturing the image data 113, adjusting S1006 a focus setting 123 of the video camera between a present focus setting 125 and an altered focus setting 127. The adjusting S1006 a focus setting 123 of the video camera between a present focus setting 125 and an altered focus setting 127 is performed such that a first subset 115 of the image data 113 is captured with the video camera 100 being set in the present focus setting 125 and such that a second subset 117 of the image data 113 is captured with the video camera 100 being set in the altered focus setting 127. Further, the adjusting S1006 is performed such that a difference between the present focus setting 125 and the altered focus setting 127 is below the focus setting difference threshold 129. Forming S1008 the video stream 119 by applying the filter function 104 on the image data 113. Determining S1010 a first focus metric 135 of the first subset 115 of the image data 113 and a second focus metric 137 of the second subset 117 of the image data 113. The first and second focus metrics 135, 137 are determined S1010 on the image data 113 prior to applying the filter function 104 on the image data 113. Determining S1012 whether the video camera 100 is out-of-focus by comparing the first and second focus metrics 135, 137.

The step of capturing S1002 the image data 113 may be performed continuously, thus forming a continuous uninterrupted stream of image data 113.

The image data 113 may be in a digital image format or in the array or list of pixel color values representing an image or images. Image data 113 may correspond to one image frame or a plurality of image frames being part of a raw video stream. The subdivision into the first subset 115 and the second subset 117 of the image data 113 may be based on whether the present focus setting 125 or the altered focus setting 127 was active during the capture of that specific part of the image data 113. The first subset 115 of the image data 113 may correspond to a first subset of image frames. The second subset 117 of the image data 113 may correspond to a second subset of image frames. The first subset 115 of the image data 113 and the second subset 117 of the image data 113 may correspond to chronologically interleaved image frames.

The focus setting 123 may be associated with a numerical value representing it. The same applies for the present focus setting 125, the altered focus setting 127, and the focus setting difference threshold 129. Maintaining that the difference between the present focus setting 125 and the altered focus setting 127 is below the focus setting difference threshold 129 may be understood as having differences between the focus settings 125, 127 numerical values being less than a numerical value representing the focus setting difference threshold 129.

The step of setting S1004 the focus setting difference threshold 129 may comprise determining what type of filter function 104 is used and what filter settings said filter function 104 features and translating this information into a numerical representation of the focus setting difference threshold 129.

The step of adjusting S1006 the focus setting 123 of the video camera 100 between a present focus setting 125 and an altered focus setting 127 may be understood as a temporal step function where the present focus setting 125 is used for a certain number of images followed by a certain number of images captured with the video camera 100 using the altered focus setting 127. The function may be temporally iterated for a certain number of image frames.

Each of the first and second subsets 115, 117 of the image data 113 may comprise temporally immediately successive images. The subsets 115, 117 may also comprise images not temporally immediately successive, i.e. images temporally separated by other images.

The step of forming the video stream 119 by applying the filter function 104 on the image data 113 may be performed continuously. The first and second subsets 115, 117 of the image data 113 may be stitched together according to their original temporal order before applying the filter function 104 and forming the video stream 119.

As illustrated in FIG. 2, the step of determining S1010 focus metrics 135, 137 may be performed on the subsets 115, 117 of the image data 113 prior to application of the filtering function 104 in the step of forming S1008 the video stream 119. This may be understood as the determination S1010 being performed temporally prior to the forming step S1008. It may also be understood as the determination S1010 being performed on the subsets 115, 117 of the image data as a separate step to the forming step S1008, even if the determination S1010 is performed temporally after the forming step S1008. In practice, the subsets 115, 117 of image data 113 may be stored until much later for determining whether the video camera 100 was OOF at the time that image data 113 was captured. The forming S1008 of the video stream 119 may progress continuously and independently of the determination steps S1010, S1012.

The focus metrics 135, 137 may be understood as numerical value representations a level of focus of the video camera 100. These may be associated with spatial frequency image content in respective subset 115, 117 of the image data 113. Generally, spatial high frequency image content is associated with sudden and/or large changes between adjacent pixels in the image. High spatial frequency image content may be associated with a higher level of focus compared to low spatial frequency image content. Spatial frequency in image content may be affected by a variety of different factors, with the focus setting 123 of the video camera 100 being one of these factors.

The focus metrics 135, 137 may be determined in by e.g. an edge detection algorithm. The focus metrics 135, 137 may be determined in by analyzing spatial variance in the image data 113.

The step of determining S1012 whether the video camera 100 is OOF by comparing the focus metrics 135, 137 may comprise comparing the numerical value representations of the focus metrics 135, 137. The comparison may comprise determining an absolute difference between the focus metrics 135, 137 or a percentage/fractional difference between the focus metrics 135, 137. The video camera 100 may be determined to be in focus if the comparison returns a difference that is smaller than a predetermined threshold, indicative of the focus metrics 135, 137 both being near the top of the focus metric hill.

Alternatively, the determination S1012 may simply comprise comparing which of the focus settings 125, 127 that produce the largest value focus metric 135, 137 for the image data 113 subsets 115, 117. E.g. if the present focus setting 125 produces a focus metric 135 that is less than the focus metric 137 produced by the altered focus setting 127, the video camera 100 may be determined to be OOF. For this end, it may be advantageous to check additional focus metrics, e.g. adjusting focus settings both ways from the present focus setting 125.

The focus setting difference threshold 129 may be set such that the step of forming S1008 the video stream 119 by applying the filter function 104 on common image data, captured with different focus settings 123, results in substantially indifferent video stream image data.

The filter function 104 may comprise one or more of a noise reduction function and an encoding function.

The filter function 104 may comprise a temporal noise filtering function, TNF. The filter function 104 may comprise a spatial filtering function. The filter function 104 may comprise a compression function intended to reduce the memory and bandwidth requirements for storing and transmitting the video stream 119.

The focus setting difference threshold 129 may be based on a filter intensity of the filter function 104. This may be understood as e.g. a filter cut-off frequency. The focus setting difference threshold 129 may be a based on a quantization parameter, QP, of the filter function 104 being an encoding function or a compression function.

The focus setting 123 may comprise a relative position between the image sensor 102 and a focusing lens 101 of the video camera 100. In this case the focus setting difference threshold 129 may be understood as the difference in distance between the focusing lens 101 and the image sensor 102 when the video camera 100 is set to the present focus setting 125 and the corresponding distance when the video camera 100 is set to the altered focus setting 127. The focus setting difference threshold 129 may be understood as a maximum optics shift distance.

The focus setting 123 may comprise one or more of a lens focal distance, a lens focal depth, and a lens curvature radius.

The lens focal distance may be a distance from the focusing lens 101 to its focal point. The lens focal depth may be a range around the focal point of a focusing lens 101 wherein the focus is determined to be acceptable. The lens curvature radius may be a radius of an ellipsoid or spheroid created by extending the curvature of the lens. The radius may be the distance between the surface of the curvature and the center of the ellipsoid or spheroid. The radius may be positive for a convex lens and negative for a concave lens.

The video camera 100 may feature various means for adjusting the focus setting 123. The video camera 100 means for adjusting the focus setting 123 may be associated with an autofocus function or OOF correction function of the video camera 100.

The means for adjusting the focus setting 123 may alternatively be configured to primarily be adequate for adjusting the focus setting 123 within a range large enough to allow the method to be performed. In effect, this may mean that the means for adjusting the focus setting 123 may not be enough to actually correct the focus setting 123 in the case where it has been determined that the video camera 100 is OOF. As such the method may primarily be considered a method for determining whether the video camera 100 is OOF. Therefore, the method may be applicable to less complex camera systems substantially lacking in focus setting adjustment means. This may be the case for cameras intended to capture a substantially static scene, generally not requiring any focus setting adjustment under normal operating conditions.

The focus setting 123 may be adjusted by physically adding, removing, or replacing optics, e.g. a lens, in the optic path of the video camera 100. Optics may be understood as glass-based optics or polymer-based optics.

The focus setting 123 may in some cases be substantially fixed. For such a camera, a need to determine whether it is OOF, may be required due to physical effects resulting in the camera ending up being OOF. Such physical effects may include mechanical effects, such as vibrations and deformations of camera optics, thermal effects, such as expansion and contraction of camera optics, or contamination effects, such as dust and particles gathering on surfaces of the camera optics.

The first focus metric 135 of the first subset 115 of the image data 113 and the second focus metric 137 of the second subset 117 of the image data 113 may comprise an image sharpness metric.

The first focus metric 135 of the first subset 115 of the image data 113 and the second focus metric 137 of the second subset 117 of the image data 113 may comprise an image contrast metric.

The method may further comprise determining statistical information relating to the first focus metric 135 of the first subset 115 of the image data 113 and/or the second focus metric 137 of the second subset 117 of the image data 113. The determined focus metrics 135, 137 may be averaged. Averaged values for the respective focus metrics 135, 137 may in such a case be compared. Medians of the focus metrics 135, 137 may also be taken, and in such a case the medians may be compared.

The method may be implemented by a computer or other processing device. A non-transitory computer readable storage medium comprising instructions which, when executed by a computer, may cause the computer to carry out the method. The computer, or other processing device, as well as the non-transitory computer readable storage medium may be communicatively or physically integrated with the video camera 100.

As shown in FIG. 1 the video camera 100 may comprise an image sensor 102 and control circuitry 103. The image sensor 102 is configured to capture S1002 image data 113.

The control circuitry 103 is configured to set S1004 a focus setting difference threshold 129 based on a filter setting of a filter function 104, wherein the filter function 104 is configured to filter the image data 113 as part of transforming the image data 113 to a video stream 119.

The control circuitry 103 is further configured to adjust S1006 a focus setting 123 of the video camera 100 between a present focus setting 125 and an altered focus setting 127. The adjusting S1006 may be performed while capturing the image data 113. The adjusting S1006 of the focus setting 123 of the video camera 100 between the present focus setting 125 and the altered focus setting 127 may be made such that a first subset 115 of the image data 113 is captured with the video camera 100 being set in the present focus setting 125 and such that a second subset 117 of the image data 113 is captured with the video camera 100 being set in the altered focus setting 127. Further, the adjusting S1006 may be performed such that a difference between the present focus setting 125 and the altered focus setting 127 is below the focus setting difference threshold 129.

The control circuitry 103 is further configured to form S1008 the video stream 119 by applying the filter function 104 on the image data 113.

The control circuitry 103 is further configured to determine S1010 a first focus metric 135 of the first subset 115 of the image data 113 and a second focus metric 137 of the second subset 117 of the image data 113. The first and second focus metrics 135, 137 may be determined on the image data 113 prior to applying the filter function 104 on the image data 113.

The control circuitry 103 is further configured to determine S1012 whether the video camera 100 is out-of-focus. This may be made by comparing the first and second focus metrics 135, 137.

The control circuitry 103 may be implemented as hardware, i.e., an image processing device, in software, i.e. computer instructions, or a combination thereof.

The video camera 100 may be a monitoring camera. The video camera 100 may continuously capture S1002 image data 113, image frame by image frame. The image data 113 may represent a scene. The scene captured by the video camera 100 may represent a primarily static scene. By primarily static, it should be understood that the video camera 100 may not intended for substantial motion in the scene, either associated with movement of the camera or movements of objects in the scene. Under normal conditions only a minority of the pixels in image data 113 associated with such a scene will change between images. Examples of such scenes include outdoor environments such as a parking lot, a traffic junction, an industrial yard, etc. Further examples of scenes include indoor environments such as rooms, corridors, factory halls, warehouses, etc.

The video camera 100 may be a visual light camera, i.e. primarily capturing photons in the wavelength range between 380 nm and 740 nm. The video camera 100 may be an infrared camera, i.e. capturing photons in the wavelength range somewhere on the range between 700 nm and 1 mm. The image sensor 102 may be configured for the different photon wavelength ranges. The image sensor 102 may comprise a semiconductor device that transforms input photon signals to output electrical signals. The image sensor 102 may be a charge-coupled device, CCD. The image sensor 102 may be an active-pixel sensor based on complementary metal-oxide-semiconductor, CMOS. The image sensor 102 may comprise a PIN diode. The image sensor 102 may comprise a photodiode. The photodiode may be pinned.

The video camera 100 may comprise a focusing lens 101. The focusing lens may comprise a single optical lens or an optical system, configured to focus photons onto the image sensor 102. The focusing lens 101 may comprise a convex lens. The focusing lens 101 may comprise a concave lens. Additionally, variations to the disclosed embodiments can be understood and effected by the skilled person in practicing the claimed invention, from a study of the drawings, the disclosure, and the appended claims.

The invention claimed is:

1. A method for determining whether a video camera is out-of-focus, the method comprising:
    capturing, by an image sensor of the video camera, image data;
    setting a focus setting difference threshold based on a filter setting of a filter function,
    wherein the filter function is configured to filter the image data as part of transforming the image data to a video stream so that redundant, or deemed superfluous, information from the image data is removed during the process of transforming the image data to a video stream, wherein the focus setting difference threshold is set such that the step of forming the video stream by applying the filter function on common image data, captured with different focus settings, results in substantially indifferent video stream image data;
    while capturing the image data, adjusting a focus setting of the video camera between a present focus setting and an altered focus setting such that a first subset of the image data is captured with the video camera being set in the present focus setting and such that a second subset of the image data is captured with the video camera being set in the altered focus setting, wherein the adjusting is performed such that a difference between the present focus setting and the altered focus setting is below the focus setting difference threshold;
    forming the video stream by applying the filter function on the image data;
    determining a first focus metric of the first subset of the image data and a second focus metric of the second subset of the image data, wherein the first and second focus metrics are determined on the image data prior to applying the filter function on the image data; and
    determining whether the video camera is out-of-focus by comparing the first and second focus metrics.

2. The method according to claim 1, wherein the filter function comprises a noise reduction function.

3. The method according to claim 1, wherein the filter function comprises an encoding function.

4. The method according to claim 1, wherein the focus setting comprises a relative position between the image sensor and a focusing lens of the video camera.

5. The method according to claim 1, wherein the focus setting comprises one or more of a lens focal distance, a lens focal depth, and a lens curvature radius.

6. The method according to claim 1, wherein the first focus metric of the first subset of the image data and the second focus metric of the second subset of the image data comprise an image sharpness metric.

7. The method according to claim 1, wherein the first focus metric of the first subset of the image data and the second focus metric of the second subset of the image data comprise an image contrast metric.

8. The method according to claim 1, further comprising determining statistical information relating to the first focus metric of the first subset of the image data and/or the second focus metric of the second subset of the image data.

9. A non-transitory computer readable storage medium comprising instructions which, when executed by a computer, cause the computer to carry out a method for determining whether a video camera is out-of-focus, the method comprising:
    capturing, by an image sensor of the video camera, image data;
    setting a focus setting difference threshold based on a filter setting of a filter function,
    wherein the filter function is configured to filter the image data as part of transforming the image data to a video stream so that redundant, or deemed superfluous, information from the image data is removed during the process of transforming the image data to a video stream, wherein the focus setting difference threshold is set such that the step of forming the video stream by applying the filter function on common image data, captured with different focus settings, results in substantially indifferent video stream image data;
    while capturing the image data, adjusting a focus setting of the video camera between a present focus setting and an altered focus setting such that a first subset of the image data is captured with the video camera being set in the present focus setting and such that a second subset of the image data is captured with the video camera being set in the altered focus setting, wherein the adjusting is performed such that a difference between the present focus setting and the altered focus setting is below the focus setting difference threshold;
    forming the video stream by applying the filter function on the image data;
    determining a first focus metric of the first subset of the image data and a second focus metric of the second subset of the image data,
    wherein the first and second focus metrics are determined on the image data prior to applying the filter function on the image data; and
    determining whether the video camera is out-of-focus by comparing the first and second focus metrics.

10. A video camera comprising:
    an image sensor, configured to capture image data; and
    control circuitry, configured to:

set a focus setting difference threshold based on a filter setting of a filter function, wherein the filter function is configured to filter the image data as part of transforming the image data to a video stream so that redundant, or deemed superfluous, information from the image data is removed during the process of transforming the image data to a video stream, wherein the focus setting difference threshold is set such that the step of forming the video stream by applying the filter function on common image data, captured with different focus settings, results in substantially indifferent video stream image data;

adjust, while capturing the image data, a focus setting of the video camera between a present focus setting and an altered focus setting such that a first subset of the image data is captured with the video camera being set in the present focus setting and such that a second subset of the image data is captured with the video camera being set in the altered focus setting, wherein the adjusting is performed such that a difference between the present focus setting and the altered focus setting is below the focus setting difference threshold;

form the video stream by applying the filter function on the image data;

determine a first focus metric of the first subset of the image data and a second focus metric of the second subset of the image data, wherein the first and second focus metrics are determined on the image data prior to applying the filter function on the image data;

determine whether the video camera is out-of-focus by comparing the first and second focus metrics.

11. The video camera according to claim 10, wherein the filter function comprises a noise reduction function.

12. The video camera according to claim 10, wherein the filter function comprises an encoding function.

13. The video camera according to claim 10, wherein the focus setting comprises a relative position between the image sensor and a focusing lens of the video camera.

14. The video camera according to claim 10, wherein the focus setting comprises one or more of a lens focal distance, a lens focal depth, and a lens curvature radius.

15. The video camera according to claim 10, wherein the first focus metric of the first subset of the image data and the second focus metric of the second subset of the image data comprise an image sharpness metric.

* * * * *